United States Patent
Heep

(10) Patent No.: US 6,547,267 B1
(45) Date of Patent: Apr. 15, 2003

(54) AXLE SYSTEM FOR ARTICULATED ARRANGEMENT OF VEHICLE AXLES IN MOTOR VEHICLES AND METHOD FOR MANUFACTURING SAME

(75) Inventor: Theo Heep, Krefeld (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/648,064

(22) Filed: Aug. 25, 2000

(30) Foreign Application Priority Data

Aug. 25, 1999 (DE) .......................... 199 40 364

(51) Int. Cl.⁷ ................................ B60G 7/00
(52) U.S. Cl. ........... 280/124.128; 74/588; 280/124.134; 280/124.153
(58) Field of Search .................... 280/124.128, 124.132, 280/124.133, 124.134, 124.153, 124.135, 124.136; 74/588

(56) References Cited

U.S. PATENT DOCUMENTS

| | | | |
|---|---|---|---|
| 3,121,348 A | 2/1964 | Reed | |
| 3,127,192 A | * 3/1964 | Traugott et al. | ...... 280/124.136 |
| 4,948,297 A | * 8/1990 | Herchenback et al. | ...... 403/122 |
| 5,720,833 A | 2/1998 | Grube et al. | |
| 6,149,198 A | * 11/2000 | Klaas | .................. 280/124.128 |
| 6,192,775 B1 | * 2/2001 | Murata | ..................... 74/579 R |

FOREIGN PATENT DOCUMENTS

| | | |
|---|---|---|
| DE | 4322632 | 1/1995 |
| DE | 4441219 | 5/1996 |
| DE | 19604630 | 8/1997 |
| DE | 19735753 | 4/1998 |
| DE | 19758292 | 11/1998 |

\* cited by examiner

*Primary Examiner*—Eric Culbreth
(74) *Attorney, Agent, or Firm*—Tarolli, Sundheim, Covell & Tummino L.L.P.

(57) ABSTRACT

The subject of the present invention is an axle system for the articulated arrangement of vehicle axles in motor vehicles, comprising an axle strut body (1) and at least one joint body (2), with said axle strut body (1) having recesses (7, 8) that are formed in the end regions (5, 6) to receive the joint body (2). To create an axle system that can be produced cost-effectively and without additional work steps and that has a low rate of wear even under high dynamic and static loads, the present invention proposes that the axle strut body (1) and the joint bodies (2) each be made as a one-piece closed hollow section, with the joint bodies (2) being pivot type and set into the recesses of the axle strut body (1) in a form-fit and/or friction-locked manner.

18 Claims, 5 Drawing Sheets

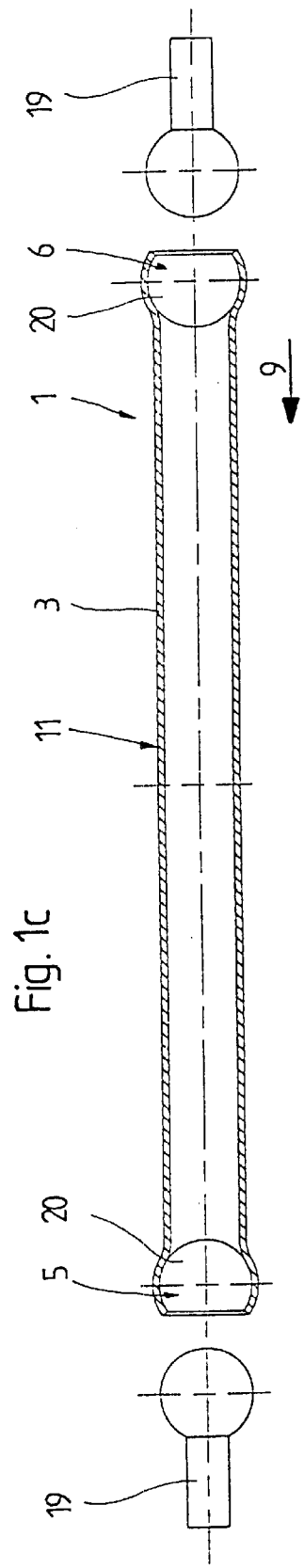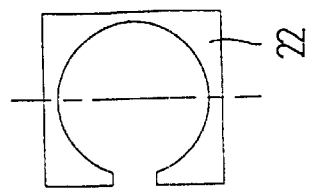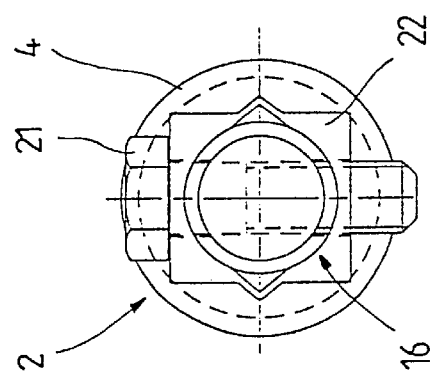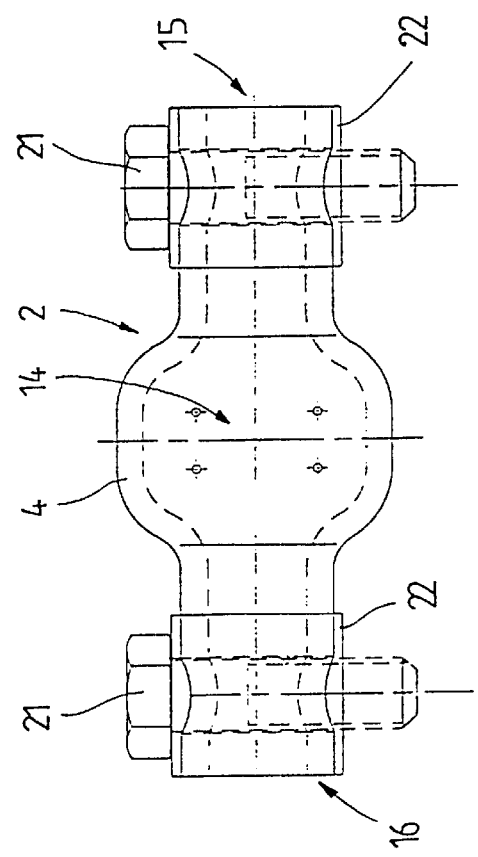

Figure 2:
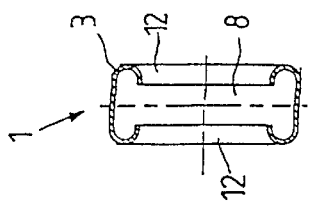

AXLE SYSTEM FOR ARTICULATED ARRANGEMENT OF VEHICLE AXLES IN MOTOR VEHICLES AND METHOD FOR MANUFACTURING SAME

The present invention relates to an axle system for the articulated arrangement of vehicle axles in motor vehicles, comprising an axle strut body and at least one joint body, wherein the axle strut body has recesses that are formed in the end regions to receive the joint body.

An axle strut body for the articulated arrangement of vehicle axles in motor vehicles is known from DE 44 41 219 A1. This document discloses two bar-shaped sections that are joined together to form a one-piece axle strut body. These rod-shaped sections are hollow sections and are produced from shell-shaped open parts. A joining technique known per se, e.g. gluing, ultrasonic or orbital welding, or elastically deformable snap elements are used to connect the shell-shaped profiles with one another to form a hollow axle strut body.

Axle strut bodies at most have to withstand static and dynamic loads, particularly regarding tensile and compressive stresses, and furthermore have to have a low rate of wear. In the axle strut body disclosed in DE 44 41 219 A1, the static and dynamic chassis forces that occur under load are introduced into the axle strut body via bearing eyes. Depending on the loading case, different compressive and tensile stresses occur in the two section elements forming the axle strut body. As a consequence of this different loading of the two section elements, different compression and/or expansion of the section elements occur depending on the loading case. This causes very high loading of the connecting area between the two section elements joined to form an axle strut body and, in the worst case, can lead to the formation of cracks or even detachment.

Furthermore, the manufacture of the axle strut body disclosed in DE 44 41 219 A1 is disadvantageous from a production engineering point of view, since the shell-shaped open section elements first have to be injection molded in a first production step and then combined into an axle strut body in a second production step.

In view of this prior art, it is the object of the invention to provide an axle system that can be produced cost-effectively and without additional work steps and that has a low rate of wear even under high dynamic and static loads.

To attain this object, the invention proposes that the axle strut body and the joint bodies each be made as a one-piece, closed hollow section, with the joint bodies being pivot type and set into the recesses of the axle strut body in a form-fit and/or friction-locked manner.

According to this technical teaching, the axle strut body consists of a closed hollow section that is made of one piece and not produced from two joined hollow section parts as is the case in the prior art. Advantageously, the joint bodies connecting the axle strut body with the vehicle also consist of a one-piece closed hollow section. Consequently, the axle strut bodies as well as the joint bodies can each be produced cost-effectively in a single production step.

The fact that the axle strut body and the joint bodies are made in one piece provides the advantage of a better force flow, so that even if loads are high, the strains occurring in the axle strut body do not result in premature failure of the axle system due to wear. Furthermore, the one-piece design of the axle strut body and the joint bodies has the advantage that the static and dynamic chassis forces occurring under load due to compressive and tensile stresses are distributed over the entire surface of the hollow section element. This eliminates peak stresses due to material junctions. Depending on the expected load conditions, both the joint body and the axle strut body can thus be dimensioned in a simple manner, since only the material to be used and the wall thickness of the hollow section have to be defined.

For a force-optimized introduction into the axle strut body of the static and dynamic chassis forces occurring under load, the joint bodies according to the invention are inserted in form-fit and/or friction-locked manner into corresponding recesses provided in the axle strut body. For this purpose, the joint bodies are pivot type and can be simply inserted into the corresponding recesses made in the end regions of the axle strut body and can be connected with the axle strut body. The pivot type design of the joint bodies has two essential advantages. On the one hand the forces introduced via the connecting components of the vehicle into the joint bodies and ultimately into the axle strut body can be redirected in a defined and especially smooth manner. Peak stresses are thus avoided. On the other hand, the pivot type design of the joint body makes it possible to design the articulated arrangement of the axle strut relative to the connecting components of the vehicle in such a way that a force is introduced either in longitudinal or transverse direction of the pivot type joint bodies. This advantage offers the possibility of orienting the axle system as a function of the space available on the vehicle.

A further advantage of the axle system according to the invention results from the fact that both the axle strut bodies and the joint bodies are made of a hollow section. This reduces the overall weight of the motor vehicle and advantageously increases the useful load weight.

According to an advantageous proposal of the invention, the axle strut body has a changing cross-sectional area in longitudinal direction. The cross-sectional area in the central region of the axle strut body is circular and in the two end regions substantially rectangular. On the one hand this shape of the axle strut body permits a uniform distribution of the stresses occurring in the central region over the entire surface of the hollow section, which in this region has a circular cross-section. On the other hand the end regions that are provided with recesses to receive the joint bodies have flat support faces for the joint bodies. Other cross-sectional areas, for example rectangular or star-shaped as well as polygonal cross-sectional areas, are also possible.

According to a further advantageous proposal of the invention, the end regions and the central region of the axle strut body lie on axes that are at an angle relative to one another. Depending on the space available on the vehicle and the expected load conditions, the axle system is thus adaptable to the specific requirements of the individual applications.

According to a further advantageous proposal of the invention, the recesses formed in the end regions have flanged collar-shaped edges. On the one hand, this creates centering surfaces for the joint bodies that are to be inserted into the recesses. On the other hand the collar-shaped edges of the recesses ensure a favorable force introduction into the axle strut body to avoid peak stresses in the area of the recesses accommodating the joint bodies.

According to a further advantageous proposal of the invention, the joint body has a changing cross-sectional area in longitudinal direction. The cross-sectional area in the central region of the joint body is circular, while the one in the two end regions is elliptical or circular. Other cross-sectional shapes are possible.

To protect the hollow spaces of the axle strut body and the joint body from corrosive media or dirt, an advantageous proposal of the invention provides that the hollow sections forming the axle strut body and the joint bodies be tightly sealed. Also, between the joint bodies inserted into the axle strut body and the axle strut body itself, sealing rings may be arranged, which also prevent corrosive media and dirt from entering.

According to a further advantageous proposal of the invention, the two end regions of the joint bodies are each provided with an adapter element to form a flat support face. The use of such an adaptor element may be required if the end regions of the joint bodies are, for example, circular and do not offer a flat support face for fastening means. In such a case a flat support face for the fastening means can be created by interposing an adapter element that is, for example, ring-shaped and has an inside contour corresponding to the outside contour of the end regions of the joint body. Other outside contours of the adapter element besides that forming a flat support face are also possible. A corresponding adapter element may be used to couple the end regions of a joint body with the vehicle parts to be connected irrespective of the outside contour.

According to a further advantageous proposal of the invention, the hollow section forming both the axle strut body and the joint bodies is made of a composite material. The material properties can be advantageously adjusted to the expected load conditions.

To produce the axle system according to the invention, the present invention provides a process in which a tubular hollow section is formed into an axle strut body or joint body by hydroforming in a single process step. To produce, for example, an axle strut body, a tubular hollow section element is expanded at both ends and provided, for example, with a rectangular cross-sectional area. In the two end regions, a recess each is made in the form of a round or polygonal opening. The edges of this recess are provided with a flanged collar-shaped border. In addition to hydroforming, other production processes, such as ASE internal high pressure forming, rotary swaging or a combination thereof can be used to produce the axle strut body or the joint bodies.

The invention for the first time proposes an axle system that is formed by an axle strut body and at least one joint body, wherein both the axle strut body and the joint body are made in one piece as closed hollow sections. This advantageously achieves weight optimization and at the same time ensures high dynamic and static loading capacity due to a deliberate utilization of material properties and geometric shapes. For a force-optimized introduction into the axle strut body of the static and dynamic chassis forces occurring under load, the joint bodies are pivot type and can be inserted in form-fit and/or friction-locked manner into the recesses formed in the end regions of the axle strut body. On the one hand this combination of joint body and axle strut body offers the advantage of a defined and especially smooth redirection of the forces via the connecting components of the vehicle into the joint bodies and ultimately into the axle strut bodies. This avoids peak stresses and advantageously increases loading and thus also the life of the axle system. The pivot type embodiment of the joint body furthermore makes it possible to design the articulated arrangement of the axle strut relative to connecting components of the vehicle in such a way that a force is introduced either directly in longitudinal or in transverse direction of the pivot type joint bodies. Hence the axle system can be oriented in accordance with the space available on the vehicle. The fact that the axle strut body and the joint bodies to be received by the axle strut body are each made in one piece has the advantage of ensuring an optimized force flow, so that the compressive and tensile stresses occurring under load due to static and dynamic chassis forces are uniformly distributed over the entire surface of the hollow sections. Premature wear-related failure of the axle system can thus be advantageously avoided. In addition, using a hollow section element for both the axle strut body and the joint bodies makes it possible to optimize the weight. As a result, the total weight of the vehicle can be reduced and the useful load weight can consequently be increased.

Figure 3:
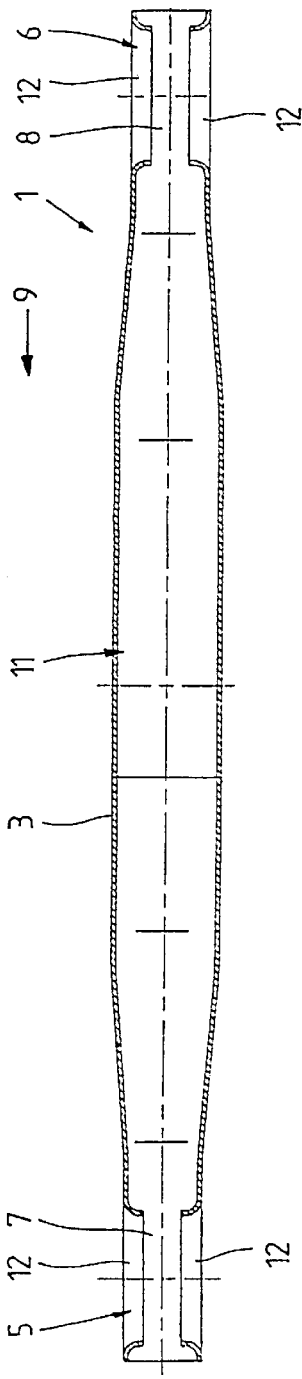
Figure 1A:
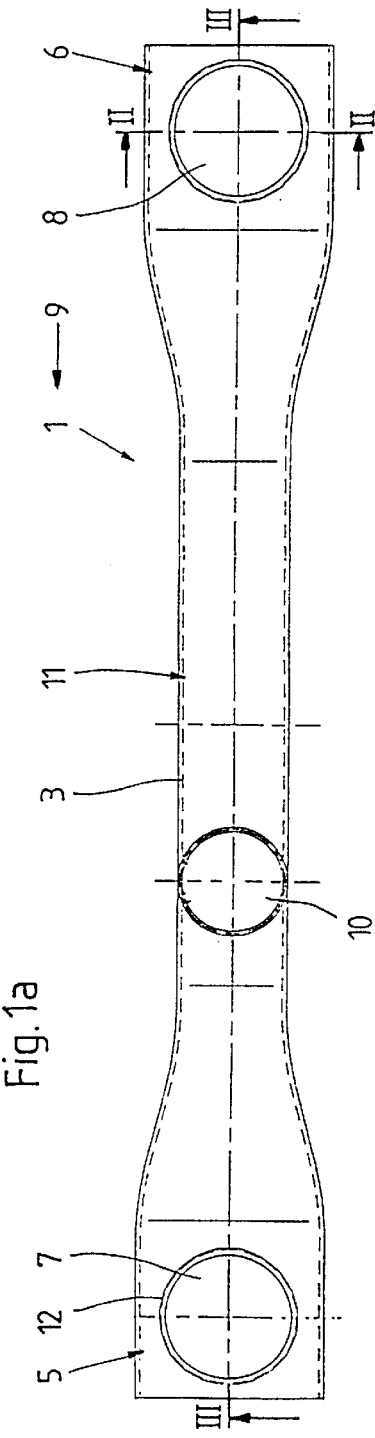
Figure 1B:
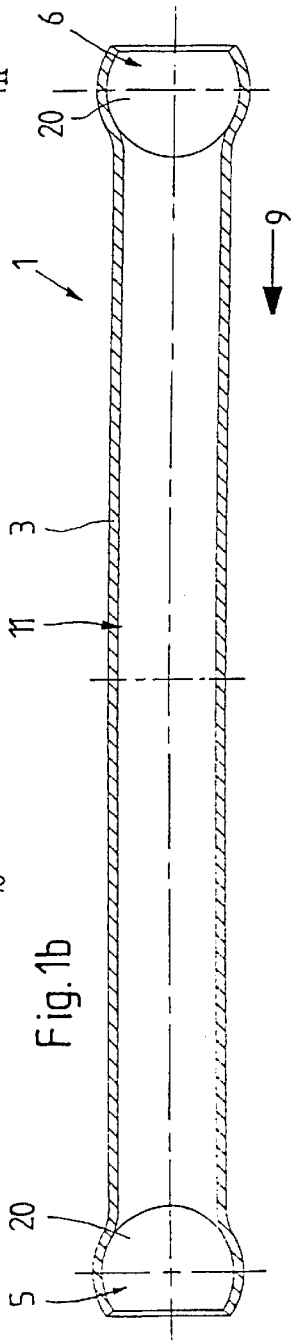
Figure 4:
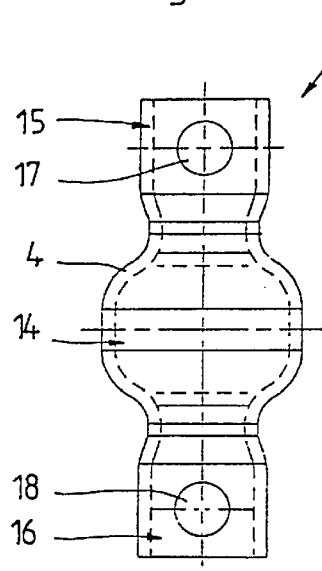
Figure 6:
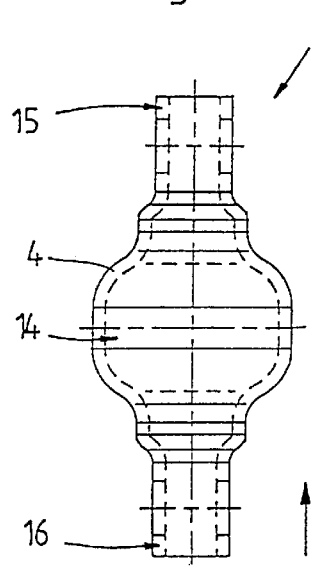
Figure 8:
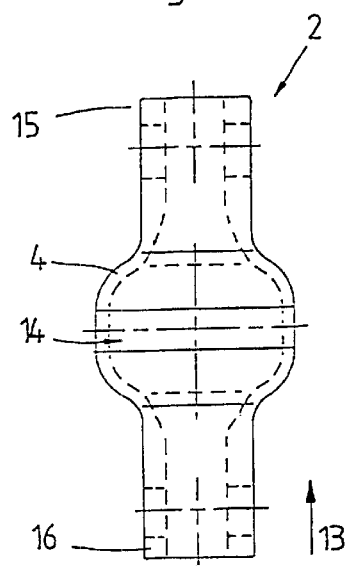
Figure 5:
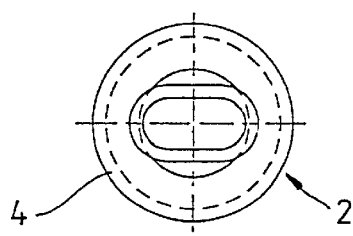
Figure 7:
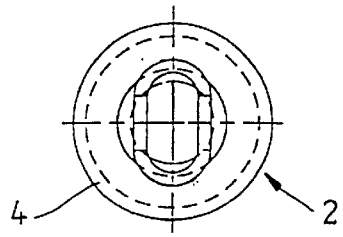
Figure 9:
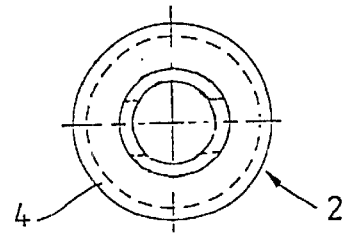
Figure 13:
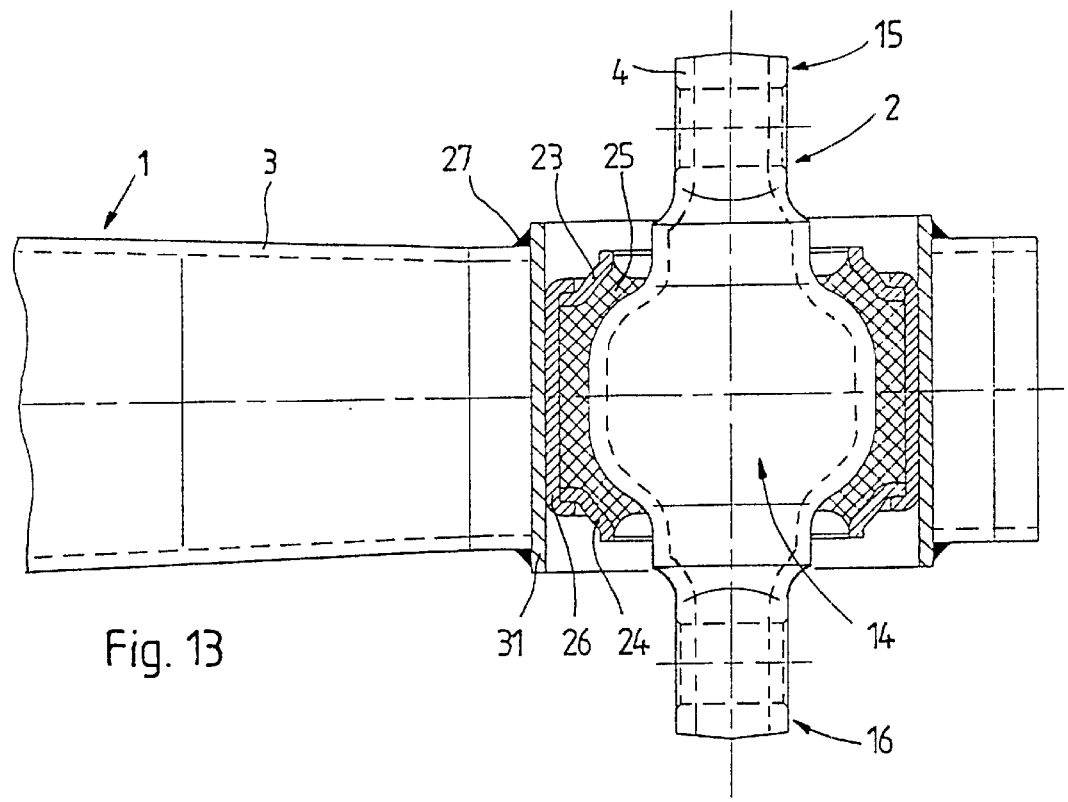
Figure 14:
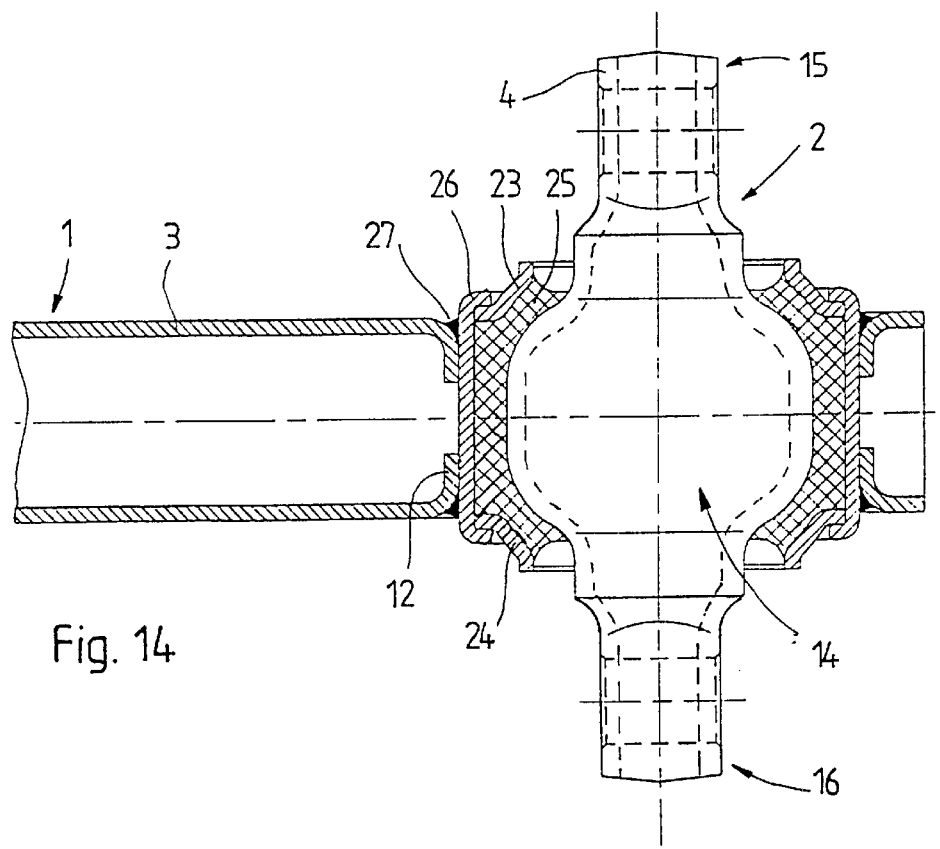
Figure 15:
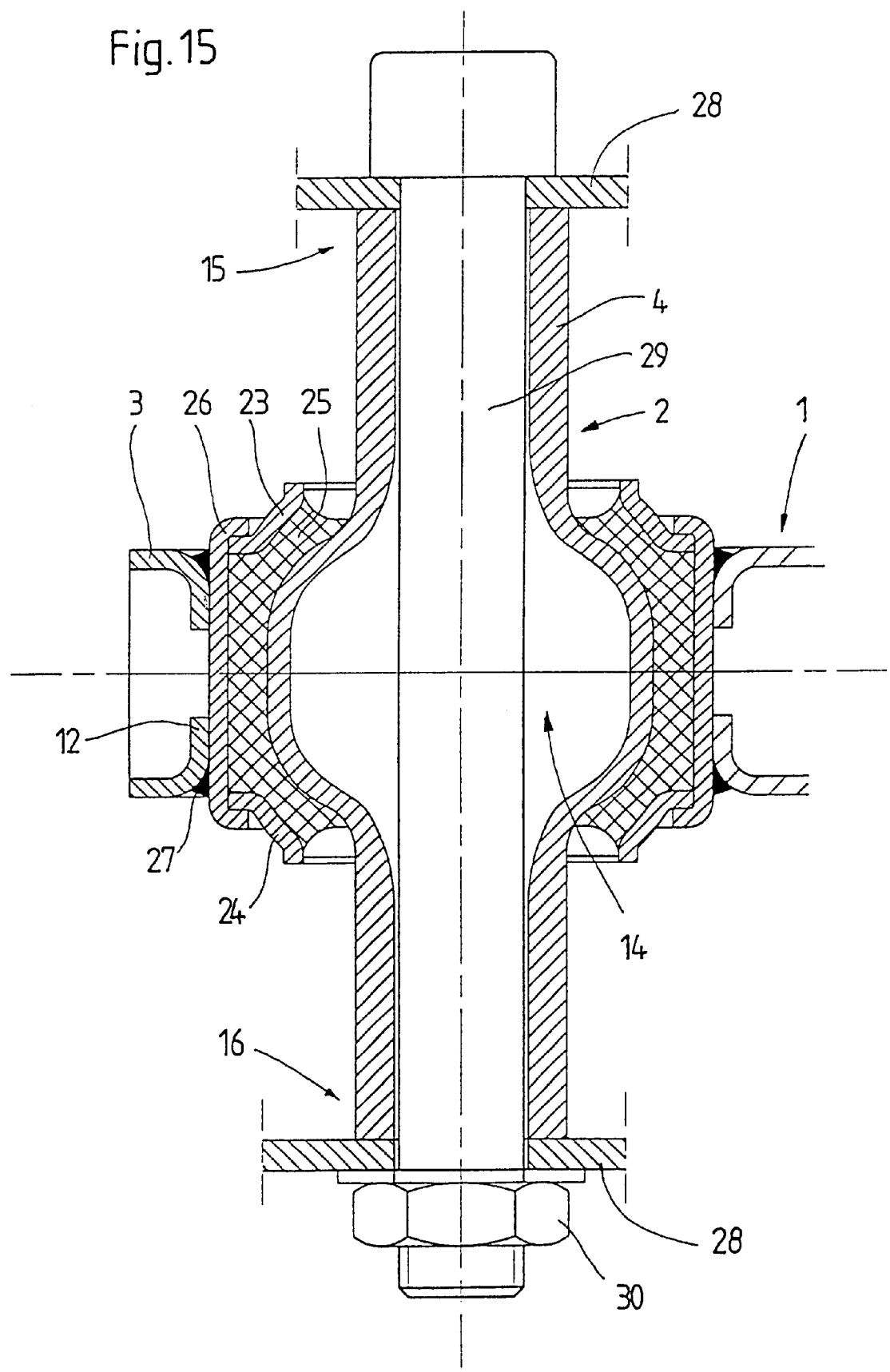

Further details, features and advantages of the invention will become clear from the following description and the pertaining drawings schematically depicting a preferred embodiment of the axle system, in which FIG. 1*a* is a top view of an axle strut body according to a first embodiment, FIG. 1*b* is a top view of an axle strut body according to a second embodiment, FIG. 1*c* is a top view of the axle strut body according to FIG. 1*b* with ball pivots;

FIG. 2 is a sectional side elevation view of the axle strut body taken along the section line 11 in FIG. 1*a*, FIG. 3 is a sectional side elevation view of the axle strut body taken along line III in FIG. 1*a*, FIG. 4 is a side elevation view of a joint body according to a first embodiment, FIG. 5 is a top view of the joint body according to FIG. 4, FIG. 6 is a side elevation view of the joint body rotated 90° relative to that shown in FIG. 4, FIG. 7 is a top view of the joint body according to FIG. 6, FIG. 8 is a side elevation view of a joint body according to a second embodiment, FIG. 9 is a top view of the joint body according to FIG. 8, FIG. 10 is a side elevation view of the joint body according to FIG. 8 with adapter elements, FIG. 11 is a top view of the joint body according to FIG. 10, FIG. 12 is a top view of an adapter element, FIG. 13 is a sectional side elevation view of a joint body inserted into the recess of an axle strut body according to a first embodiment, FIG. 14 is a sectional side elevation view of a joint body inserted into the recess of an axle strut body according to a second embodiment, and FIG. 15 is a sectional side elevation view of a joint body inserted into the recess of an axle strut body according to a third embodiment.

The axle strut body 1 depicted in FIGS. 1*a*, 2 and 3 comprises a hollow section 3 and is produced from a tubular blank by means of hydroforming. In longitudinal direction 9 the axle strut body 1 has a changing cross-sectional area 10. A circular cross-sectional area is provided in the central region 11 of the axle strut body 1 and a substantially rectangular cross-sectional area in the two end regions 5 and 6. To receive the joint bodies 2, the two end regions 5 and 6 of the axle strut body 1 each have a recess 7 and 8 in the form of a circular opening. For a uniform force introduction from the joint bodies 2 into the axle strut body 1, the respective edges 12 of the recesses 7 and 8 are each flanged and collar-shaped.

FIG. 1*b* shows an alternative embodiment of the axle strut body 1. In contrast to the axle strut body 1 depicted in FIG. 1*a*, the two end regions 5 and 6 each have a seat 20 to receive a joint body 2 in the form of a ball pivot 19. The seats 20 are formed in such a way that the joint pivot 19 is inserted in longitudinal direction 9 of the axle strut body 1. This is most clearly shown in FIG. 1c.

FIGS. 4 to 9 show a cylindrical joint body 2 in the form of an axle strut pivot, which is also produced by hydroforming. In longitudinal direction 13 this axle strut pivot has a changing cross-sectional area. The central region 14 of the axle strut pivot has a circular cross-sectional area, whereas the two end regions 15 and 16 according to the first embodiment of FIGS. 4 to 7 have an elliptical and according to the second embodiment of FIGS. 8 and 9 a circular cross-sectional area. For a friction-locked connection with the axle strut body 1 or with an element that is arranged on the vehicle and corresponds with the joint body 2 the end regions 15 and 16 are provided with bores 17 and 18.

According to the second embodiment shown in FIGS. 8 and 9, the axle strut pivot depicted in FIGS. 10 and 11 has two end regions 15 and 16 with a circular cross-sectional area each. To create a flat support face for the screws 21 that serve as fastening means, the two end regions 15 and 16 are each provided with an adapter element 22. Such an adapter element 22 is most clearly shown in FIG. 12. The adapter element 22 is essentially ring-shaped and has an inside contour corresponding with the outside contour of the end region 15, 16 of the joint body, so that a form-fit connection is created between the respective end region and the adapter element 22 arranged in this end region. The outside contour of the adapter element 22 is rectangular and has a flat connection face on all sides for mounting the vehicle parts to be connected. Depending on the design of the cross-sectional area in the end regions 15 and 16 of the joint body 2, a corresponding inside contour of the ring-shaped adapter element 22 must be selected. In place of the ring-shaped adapter element 22, an adapter element 22 of a different shape may also be used. The adapter element 22 forms the transition to a flat connection face in the end regions 15 and 16 of the joint body 2. According to an alternative embodiment of the invention, fastening means that can be integrated in the contour can be used instead of an adapter element 22. This should be understood as fastening means having a geometric form so that they can be inserted in form-fit manner into the recesses 17 and 18 that are formed in the end regions 15 and 16 of the joint bodies 2 without the use of adapter elements 22. If this type of fastening element is used, the arrangement of an adapter element 22 can be advantageously eliminated.

FIGS. 13, 14 and 15 each show an embodiment of a joint body 2 inserted into the recess 8 of an axle strut body 1. The embodiments according to FIGS. 14 and 15 show an axle strut body 1 with a recess 8 that is provided with a flanged collar-shaped edge 12 to create a force transmission surface. In contrast, the embodiment according to FIG. 13 shows an axle strut body 1 with a recess 8 into which a sleeve 31 is inserted and connected with the axle strut body 1 by material coupling in the form of a circumferential weld 27 to create a surface for force transmission.

The joint body 2 is elastically arranged within a sleeve 26 in the central region 14 using a rubber buffer 25. To prevent the rubber buffer 25 from slipping out or being squeezed out of the sleeve 26, a ring 23, 24 is provided both above and below the central region 14 of joint body 2 in the direction of the end regions 15, 16. These rings stabilize the rubber buffer 25 and prevent it from slipping out or being squeezed out of the sleeve 26. Sleeve 26 including joint body 2 arranged within sleeve 26 using a rubber buffer 25 is inserted into the recess 8 of the strut body 1. According to the embodiment of FIG. 13 the sleeve 26 is pressed in a friction-locked manner into the sleeve 31 welded together with the axle strut body 1. According to the alternative embodiment of FIGS. 14 and 15, the sleeve 26 is inserted into the recess 8 of the axle strut body 1 and connected with the axle strut body 1 by means of a circumferential weld 27.

FIG. 15 shows the coupling of an axle strut body 1 to two mutually spaced-apart connecting components 28 using a joint body 2. As described above, the joint body 2 is inserted into the recess 8 of an axle strut body 1 using an elastic buffer 25. The joint body 2 is hollow and in turn communicates with the connecting components 28 via a threaded bolt 29 inserted into joint body 2 in longitudinal direction. In the embodiment shown in FIG. 15 the detachable connection between the connecting components 28 and the joint body 2 is formed via a separate threaded bolt 29 with a nut 30 arranged on the end face. According to an alternative embodiment of the invention, the end faces 15, 16 of the joint body 2 are in turn provided with an external thread. Such an embodiment of the joint body 2 has the advantage that the arrangement of a separate threaded bolt 29 can be dispensed with. The recesses formed in the connecting components 28 would then have to be dimensioned in such a way that the end regions 15, 16 of the joint body 2 provided with an external thread could be guided through them. To secure the connection, corresponding nuts matched to the end regions 15, 16 of the joint body 2 could be used.

To produce the axle strut body 1 or the joint body 2, a tubular blank, for example, a cylindrical tube made of a composite material is shaped according to the desired outside contour. With respect to the axle strut body 1 this means that the tubular hollow section 3 is expanded at its two ends 5 and 6 and provided with a rectangular cross-sectional area 10. To produce a joint body 2, starting from a likewise tubular hollow section 4, the central region 14 of the joint body 2 is expanded and provided with a circular cross-sectional area, whereas the end regions 15 and 16 of the joint body 2 are tapered and provided with an elliptical or circular cross-sectional area. Both the axle strut body 1 and the joint body 2 are produced from a tubular blank by means of hydroforming or rotary swaging in a single work step.

List of Reference Numbers 1 axle strut body
2 joint body
3 hollow section
4 hollow section
5 end region
6 end region
7 recess
8 recess
9 longitudinal direction
10 cross-sectional area
11 central region
12 edge
13 longitudinal direction
14 central region
15 end region
16 end region
17 bore
18 bore
19 ball pivot
20 seat
21 screw
22 adapter element
23 ring
24 ring
25 rubber buffer 26 sleeve
27 weld
28 connecting component
29 threaded bolt
30 nut
31 sleeve

What is claimed is:

1. Axle system for an articulated arrangement of vehicle axles in motor vehicles, comprising an axle strut body (1) and a joint body (2), wherein the axle strut body (1) has a recess (7) formed in an end region (5) for receiving the joint body (2), characterized in that the axle strut body (1) and the joint body (2) are each made as a one-piece closed hollow section, wherein the joint body includes a first portion that is inserted into the recess (7) of the axle strut body (1) in form-fit or friction lock manner and a second portion that extends outwardly of the recess (7) to form a pivot, the recess (7) of the axle strut body (1) having flanged collar-shaped edges (12).

2. Axle system as claimed in claim 1, characterized in that the axle strut body has a changing cross-sectional area (10) in a longitudinal direction (9).

3. Axle system as claimed in claim 1, characterized in that a central region (11) of the axle strut body (1) has a circular cross-sectional area (10).

4. Axle system as claimed in claim 1, characterized in that the end region (5) of the axle strut body (1) and an opposite end region (6) of the axle strut body (1) have substantially rectangular cross-sectional areas (10).

5. Axle system as claimed in claim 1, characterized in that a sleeve (26, 31) is inserted into the recess (7) to receive the joint body (2).

6. Axle system as claimed in claim 5, characterized in that the axle strut body (1) and the sleeve (26, 31) are welded together.

7. Axle system as claimed in claim 1, characterized in that the joint body (2) has a changing cross-sectional area in a longitudinal direction (13).

8. Axle system as claimed in claim 1, characterized in that the first portion of the joint body (2) has a circular cross-sectional area and the second portion of the joint body (2) has an elliptical cross-sectional area.

9. Axle system as claimed in claim 1, characterized in that the first portion and the second portion of the joint body (2) have circular cross-sectional areas.

10. Axle system as claimed in claim 1, characterized in that the second portion of the joint body (2) receives an adapter element (22) to form a flat support face.

11. Axle system as claimed in claim 1, characterized in that a bore (17) extends through the second portion of the joint body (2), fastening means being receivable in the bore (17).

12. Axle system as claimed in claim 1, characterized in that the axle strut body (1) and the joint body (2) are made of a composite material.

13. Axle system as claimed in claim 1, characterized in that the axle strut body (1) and the joint body (2) are shaped by means of hydroforming.

14. Axle system as claimed in claim 1, characterized in that the axle strut body (1) and the joint body (2) are shaped by means of rotary swaging.

15. An apparatus for an articulated arrangement of vehicle axles in motor vehicles, the apparatus comprising:

an axle strut body having a longitudinally extending central region and first and second end regions, a first recess extending laterally through the first end region and a second recess extending laterally through the second end region, the axle strut body being formed from a one-piece, hollow tubular member and including a cavity that extends from the first end region to the second end region; and first and second joint bodies, each of the first and second joint bodies having a central region and first and second end regions, each of the first and second joint bodies being formed from a one-piece, hollow tubular member and including a cavity that extends from the first end region to the second end region, the first joint body being received in the first recess of the axle strut body, the central region of the first joint body being secured within the first recess and at least one of the first and second end regions of the first joint body extending outwardly of the first recess, the second joint body being received in the second recess of the axle strut body, the central region of the second joint body being secured within the second recess and at least one of the first and second end regions of the second joint body extending outwardly of the second recess, a buffer separating the central region of the first joint body from the first recess, the buffer being formed from a resilient material, the first recess receiving at least one ring for maintaining the buffer in the first recess.

16. The apparatus of claim 15 wherein the cross-sectional shape of the first and second end regions of the axle strut body differs from the cross-sectional shape of the central region of the axle strut body.

17. The apparatus of claim 15 wherein the cross-sectional shape of the first and second end regions of the first and second joint bodies differs from the cross-sectional shape of the central region of the joint bodies.

18. The apparatus of claim 15 further including a threaded bolt, the threaded bolt having a shank that extends through the cavity of the first joint body.

* * * * *